United States Patent
Youn et al.

(10) Patent No.: US 8,363,601 B2
(45) Date of Patent: Jan. 29, 2013

(54) METHOD FOR SUPPORTING COEXISTENCE WITH WIRELESS LOCAL AREA NETWORK

(75) Inventors: Sung June Youn, Seoul (KR); Won Yong Yoon, Seoul (KR); Ki Seon Ryu, Sungnam-si (KR); Soo Jin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 12/919,422

(22) PCT Filed: Feb. 25, 2009

(86) PCT No.: PCT/KR2009/000881
§ 371 (c)(1),
(2), (4) Date: Dec. 14, 2010

(87) PCT Pub. No.: WO2009/107970
PCT Pub. Date: Sep. 3, 2009

(65) Prior Publication Data
US 2011/0116446 A1    May 19, 2011

Related U.S. Application Data

(60) Provisional application No. 61/031,015, filed on Feb. 25, 2008, provisional application No. 61/034,489, filed on Mar. 7, 2008.

(30) Foreign Application Priority Data

Jun. 25, 2008    (KR) .................. 10-2008-0060334

(51) Int. Cl.
*H04W 4/00* (2009.01)
*H04W 72/00* (2009.01)
*H04L 12/28* (2006.01)

(52) U.S. Cl. ........ 370/328; 370/329; 370/338; 370/401; 455/450

(58) Field of Classification Search .................. None
See application file for complete search history.

(56) References Cited

U.S. PATENT DOCUMENTS

| 5,966,378 | A * | 10/1999 | Hamalainen ................. 370/348 |
| 7,764,658 | B2 | 7/2010 | Garrett et al. |
| 7,796,698 | B2 | 9/2010 | Koorapaty et al. |
| 7,826,459 | B2 | 11/2010 | Xhafa et al. |

(Continued)

FOREIGN PATENT DOCUMENTS

| JP | 2005-80312 A | 3/2005 |
| JP | 2007-43660 A | 2/2007 |

(Continued)

OTHER PUBLICATIONS

A Time Division Beacon Scheduling Mechanism for IEEE 802.15. 4/Zigbee-Tree Wireless Sensor Networks (19th Euromicro Conference on Real-Time Systems (ECRTS'07) 0-7695-2914-3//07 2007 IEEE).*

*Primary Examiner* — Quang N Nguyen
*Assistant Examiner* — Thai T Vuong
(74) *Attorney, Agent, or Firm* — Birch, Stewart, Kolasch & Birch, LLP

(57) ABSTRACT

A method for supporting coexistence with a wireless personal area network (WPAN) is provided. A method for supporting coexistence with a WPAN in a mobile station which periodically receives a beacon signal for local wireless communication includes, at the mobile station, calculating the numbers of uplink frames which overlap with the beacon signal, configuring a bitmap using the calculated frame numbers, and transmitting coexistence information including the bitmap to a base station. Accordingly, when a broadband wireless access system and WiMedia or ZigBee are simultaneously used, a beacon signal of WiMedia or ZigBee can be efficiently protected from the interruption of the broadband wireless access system and thus WiMedia or ZigBee can be normally operated.

7 Claims, 4 Drawing Sheets

U.S. PATENT DOCUMENTS

| | | | |
|---|---|---|---|
| 7,907,572 B2 | 3/2011 | Yang et al. | |
| 7,929,432 B2 | 4/2011 | Zhu et al. | |
| 2002/0080749 A1* | 6/2002 | Terry | 370/336 |
| 2004/0100939 A1 | 5/2004 | Kriedte et al. | |
| 2005/0147112 A1 | 7/2005 | Sugaya | |
| 2005/0174953 A1 | 8/2005 | Ho | |
| 2005/0201309 A1 | 9/2005 | Kang et al. | |
| 2005/0233709 A1 | 10/2005 | Gardner et al. | |
| 2005/0271006 A1* | 12/2005 | Chari et al. | 370/329 |
| 2005/0276241 A1 | 12/2005 | Kamerman et al. | |
| 2005/0276250 A1* | 12/2005 | Grieco et al. | 370/335 |
| 2006/0029031 A1* | 2/2006 | Koorapaty | 370/350 |
| 2006/0084383 A1 | 4/2006 | Ibrahim et al. | |
| 2006/0148411 A1 | 7/2006 | Cho et al. | |
| 2007/0153734 A1* | 7/2007 | Lee et al. | 370/329 |
| 2007/0165589 A1 | 7/2007 | Sakoda | |
| 2007/0224936 A1 | 9/2007 | Desai | |
| 2007/0232358 A1 | 10/2007 | Sherman | |
| 2007/0274273 A1 | 11/2007 | Grushkevich et al. | |
| 2008/0025251 A1 | 1/2008 | Lee et al. | |
| 2008/0056133 A1* | 3/2008 | Deshpande et al. | 370/235 |
| 2008/0137599 A1* | 6/2008 | Ham et al. | 370/329 |
| 2008/0159185 A1* | 7/2008 | Howard | 370/294 |
| 2008/0238807 A1 | 10/2008 | Ibrahim et al. | |
| 2009/0040990 A1 | 2/2009 | Xhafa et al. | |
| 2009/0054009 A1 | 2/2009 | Yang et al. | |
| 2009/0080401 A1 | 3/2009 | Zhu et al. | |
| 2009/0137206 A1* | 5/2009 | Sherman et al. | 455/41.2 |
| 2011/0002291 A1 | 1/2011 | Gonikberg et al. | |
| 2011/0194506 A1 | 8/2011 | Hirsch et al. | |
| 2012/0034870 A9 | 2/2012 | Desai et al. | |

FOREIGN PATENT DOCUMENTS

| | | |
|---|---|---|
| JP | 2007-68070 A | 3/2007 |
| KR | 10-1999-0025877 A | 4/1999 |
| KR | 10-2004-0064823 A | 7/2004 |
| WO | WO 2006/022530 A1 | 3/2006 |
| WO | WO 2007/000691 A1 | 1/2007 |
| WO | WO 2007-031960 A2 | 3/2007 |
| WO | WO 2007/070409 A1 | 6/2007 |
| WO | WO 2007/078118 A1 | 7/2007 |
| WO | WO 2007/091235 A2 | 8/2007 |

\* cited by examiner

METHOD FOR SUPPORTING COEXISTENCE WITH WIRELESS LOCAL AREA NETWORK

This application is the National Phase of PCT/KR2009/000881 filed on Feb. 25, 2009, which claims priority under 35 U.S.C. 119(e) to U.S. Provisional Application Nos. 61/031,015 and 61/034,489, filed on Feb. 25, 2008 and Mar. 7, 2008, respectively, and under U.S.C. 119(a) to Patent Application No. 10-2008-0060334 filed in Republic of Korea on Jun. 25, 2008, all of which are hereby expressly incorporated by reference into the present application.

TECHNICAL FIELD

The present invention relates to a method for supporting coexistence of a broadband wireless access system and a wireless personal area network (WPAN) such as WiMedia, ZigBee or the like in a mobile station, and more particularly, to a method for receiving a beacon signal of a WPAN without interruption of a broadband wireless access system.

BACKGROUND ART

A wireless local area network (WLAN) technology is a technology based on IEEE 802.11, which can access a backbone network within a radius of about 100 m. In contrast, a WPAN technology is a technology based on IEEE 802.15, which can realize wireless connection between various types of devices within a radius of about 10 m on the basis of personal portable devices, and includes Bluetooth, ZigBee, an ultra wide band (UWB) or the like.

ZigBee refers to IEEE 802.15.4 low-rate wireless personal area networks (LR-WPANs). ZigBee is a communication system which divides a frequency band into three sub-bands, and sets up spreading policies and data rates differently according to the sub-bands. The ZigBee which targets small-sized, low power and low cost products is directing attention from local area communication markets, which provide wireless networking of about 10 m to 20 m distance to houses or offices, and as a key technology for ubiquitous computing that is currently getting popular.

In a broadband wireless access system based on the IEEE 802.16e system, a sleep mode for minimizing power consumption of a mobile station is supported. In the sleep mode, the operation of the mobile station is performed by the repetition of a sleep interval and a listening interval. In the listening interval, the IEEE 802.16e system is used, and, in the sleep interval, the use of other wireless communication such as Bluetooth or WiFi is allowed to provide coexistence of a time sharing scheme.

A beacon signal includes necessary information between communicating identities. In an existence method using a sleep mode, a mobile station may not safely receive beacon signals of another radio access technology (RAT) using a beacon signal, such as WiMedia or ZigBee. That is, since the interval of the beacon signal has various values, a broadband wireless access system uses a predetermined time frame, and a repetition time interval of a sleep period and a reception time interval of the beacon signal are different from each other, the beacon signal may not be safely received in the sleep mode.

Although the broadband wireless access system and WPAN using the beacon signal, such as WiMedia or ZigBee, are implemented in one mobile station, no problem occurs when only one of the broadband wireless access system and the WPAN uses radio resources. However, when the broadband wireless access system and the WPAN simultaneously use same radio resources, a transmission signal of one system may interrupt the reading of a reception signal of the other system. Accordingly, when the broadband wireless access system sends the transmission signal, the mobile station cannot safely receive the beacon signal including important communication-related information used in WiMedia and ZigBee.

DISCLOSURE OF INVENTION

Technical Problem

Accordingly, the present invention is directed to a method for supporting coexistence with a wireless local area network that substantially obviates one or more problems due to limitations and disadvantages of the related art.

An object of the present invention is to provide a method for supporting coexistence with a wireless personal area network (WPAN), which is capable of guaranteeing the reception of a beacon signal when the WPAN and a broadband wireless access system are simultaneously used.

Technical Solution

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for supporting coexistence with a wireless personal area network (WPAN) in a mobile station, which receives a periodical beacon signal for local wireless communication, includes, at the mobile station, calculating the numbers of uplink frames which overlap with the beacon signal; configuring a bitmap using the calculated frame numbers; and transmitting coexistence information including the bitmap to a base station.

The method may further include transmitting the uplink frames to the base station in remaining periods excluding the frames indicated by the bitmap.

The method may further include receiving the periodical beacon signal at the frames indicated by the bitmap.

The base station may allocate uplink slots according to the bitmap.

In another aspect of the present invention, a method for supporting coexistence with a wireless personal area network (WPAN) in a mobile station, which periodically receives a beacon signal for local wireless communication, include, at the mobile station, calculating the numbers of uplink frames which overlap with the beacon signal in every predetermined number of uplink frames and configuring a bitmap using the calculated frame numbers; and transmitting coexistence information including the bitmap to a base station in every predetermined number of uplink frames.

The predetermined number of uplink frames may be 32 uplink frames.

In another aspect of the present invention, a method for supporting coexistence with a wireless personal area network (WPAN) in a mobile station, which periodically receives a beacon signal for local wireless communication, includes, at the mobile station, calculating information associated with the transmission of the beacon signal; and transmitting coexistence information including the calculated information associated with the transmission to a base station.

The information associated with the transmission may include at least one of a start point, a duration or an interval of the beacon signal.

The base station may calculate a time point when the reception of the beacon signal and the transmission of the uplink frames of the mobile station are overlapped, from the information associated with the transmission, and allocate uplink slots in consideration of the calculated time point.

According to the embodiments of the present invention, when a broadband wireless access system and WiMedia or ZigBee are simultaneously used, a beacon signal of WiMedia or ZigBee can be efficiently protected from the interruption of the broadband wireless access system and thus WiMedia or ZigBee can be normally operated.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
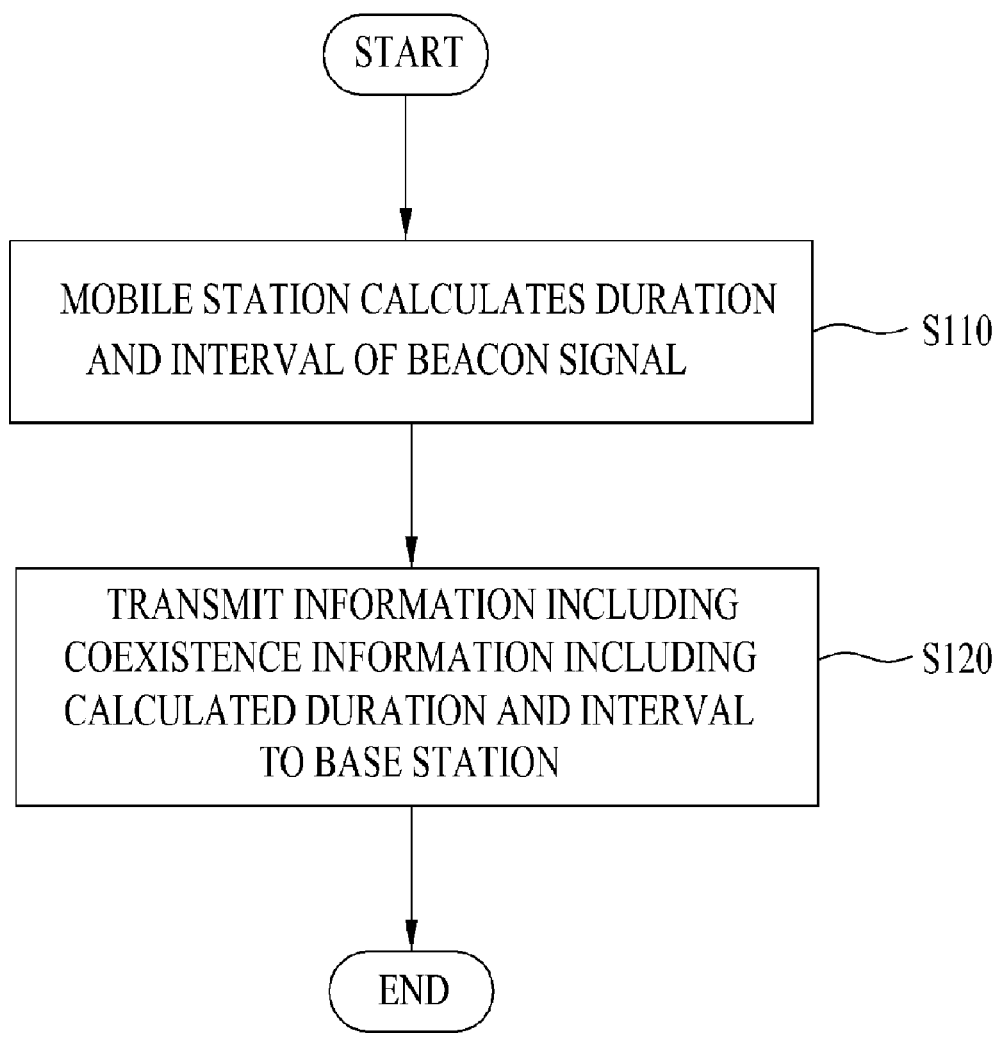
FIG. 1 is a flowchart illustrating a method for supporting coexistence with a wireless personal area network (WPAN) according to an embodiment of the present invention.

Reference will now be made in detail to the preferred embodiments of the present invention, examples of which are illustrated in the accompanying drawings. However, the embodiments of the present invention may be variously modified and the range of the present invention is not limited to the following embodiments.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The specific terms used in the following description are provided for facilitating the understanding of the present invention, and the use of the specific terms may be variously changed without departing from the technical scope of the present invention.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with an user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The present invention provides a method for supporting coexistence, which is capable of simultaneously utilizing a broadband wireless access system and a wireless personal area network (WPAN) when the broadband wireless access system and the WPAN using a beacon signal, such as WiMedia or ZigBee, are implemented in one mobile station.

Since an uplink signal of a broadband wireless access system interrupts the safe reception of a beacon signal, a mobile station does not send the uplink signal at a time when the beacon signal is received. The mobile station informs a base station of the broadband wireless access system when the mobile station receives the beacon signal of WiMedia or ZigBee, and the base station does not allocate uplink slots at the time when the mobile station receives the beacon signal of WiMedia or ZigBee. Hereinafter, two coexistence supporting methods will be described.

FIG. 1 is a flowchart illustrating a method for supporting coexistence with a WPAN according to an embodiment of the present invention.

In order to safely receive a beacon signal, a mobile station of a broadband wireless access system may inform a base station when the mobile station receives the beacon signal. Then, the base station does not allocate uplink slots at that time such that the mobile station does not send a transmission signal at that time. The mobile station may transmit information about the beacon signal to the base station using a message in the form of a threshold limit value (TLV) shown in Table 1.

TABLE 1

| Type | Length | Value | Scope |
|---|---|---|---|
| TBD | 5 | Bit #0-#12: Start point of the beacon signal (μsec). Bit #13-#22: duration of the beacon signal (μsec). Bit #23-#39: Interval of the beacon signal (μsec). | TBD |

The mobile station calculates a time point when the beacon signal is started in the frame of the current broadband wireless access system, the duration, the interval and so on of the beacon signal, in order to inform the base station of the broadband wireless access system when the beacon signal is received (S110). At this time, the duration, the interval and so on of the beacon signal may use a unit of μsec.

Next, the mobile station transmits a message including coexistence information including the calculated duration, interval and so on to the base station (S120). The mobile station may basically transmit the coexistence information only once. The base station may predict when the mobile station receives the beacon signal via computation using the coexistence information.

Figure 2:
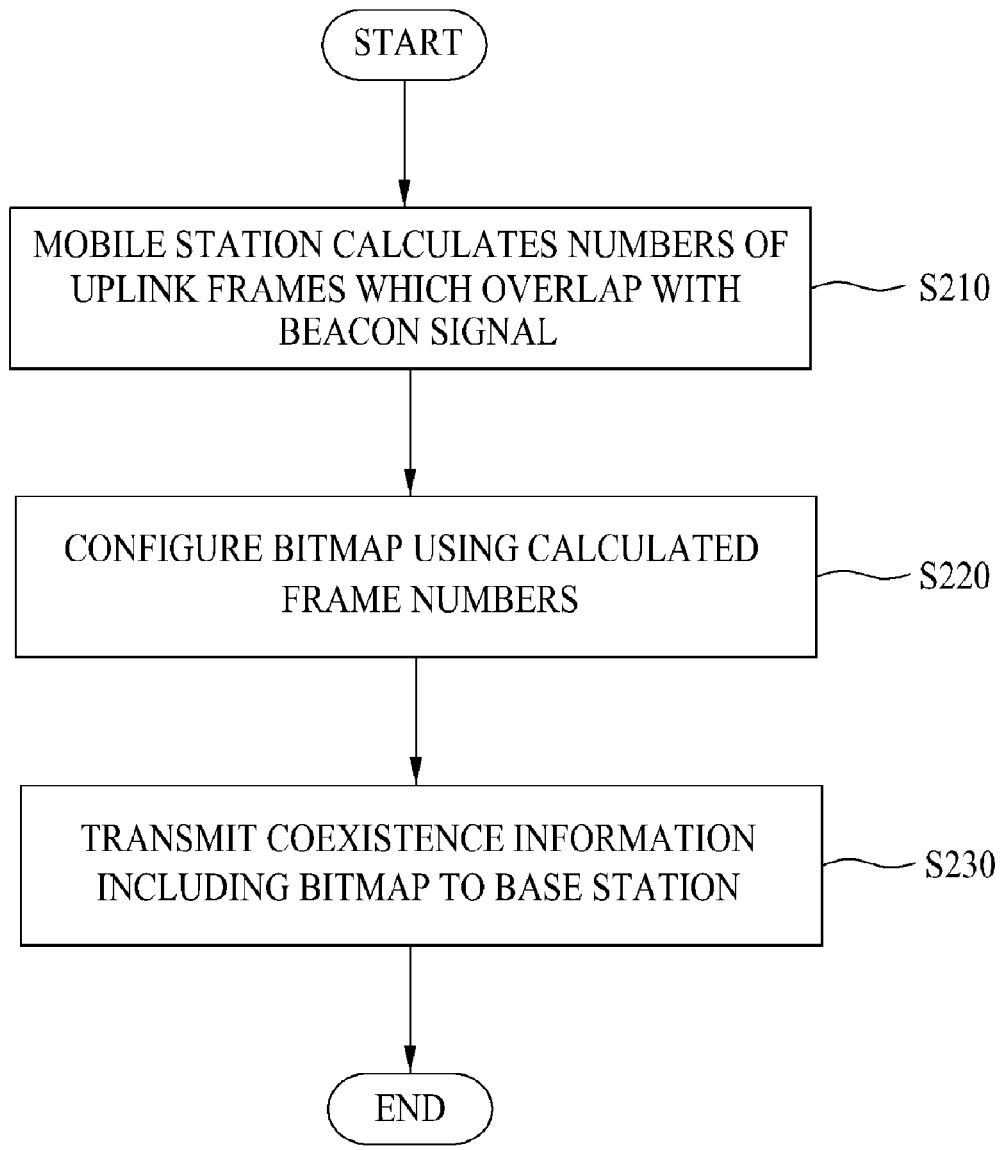
FIG. 2 is a flowchart illustrating a method for supporting coexistence with a WPAN according to another embodiment of the present invention.

FIG. 2 is a flowchart illustrating a method for supporting coexistence with a WPAN according to another embodiment of the present invention.

A mobile station calculates a portion in which an uplink frame of a broadband wireless access system and a beacon signal are overlapped and a portion in which the uplink frame and the beacon signal are not overlapped, in order to inform a base station of the broadband wireless access system when the beacon signal is received (S210). At this time, the mobile station may calculate the numbers of uplink frames which overlap with the beacon signal.

Next, the mobile station configures a bitmap according to the portion in which the uplink frame and the beacon signal are overlapped (S220). The bitmap is a set of bit information in a frame unit, which indicates whether or not the uplink frame and the beacon signal are overlapped in every frame number.

Finally, the mobile station transmits coexistence information including the configured bitmap to the base station (S230). At this time, the coexistence information may be included in any message and may be transmitted.

Figure 3:
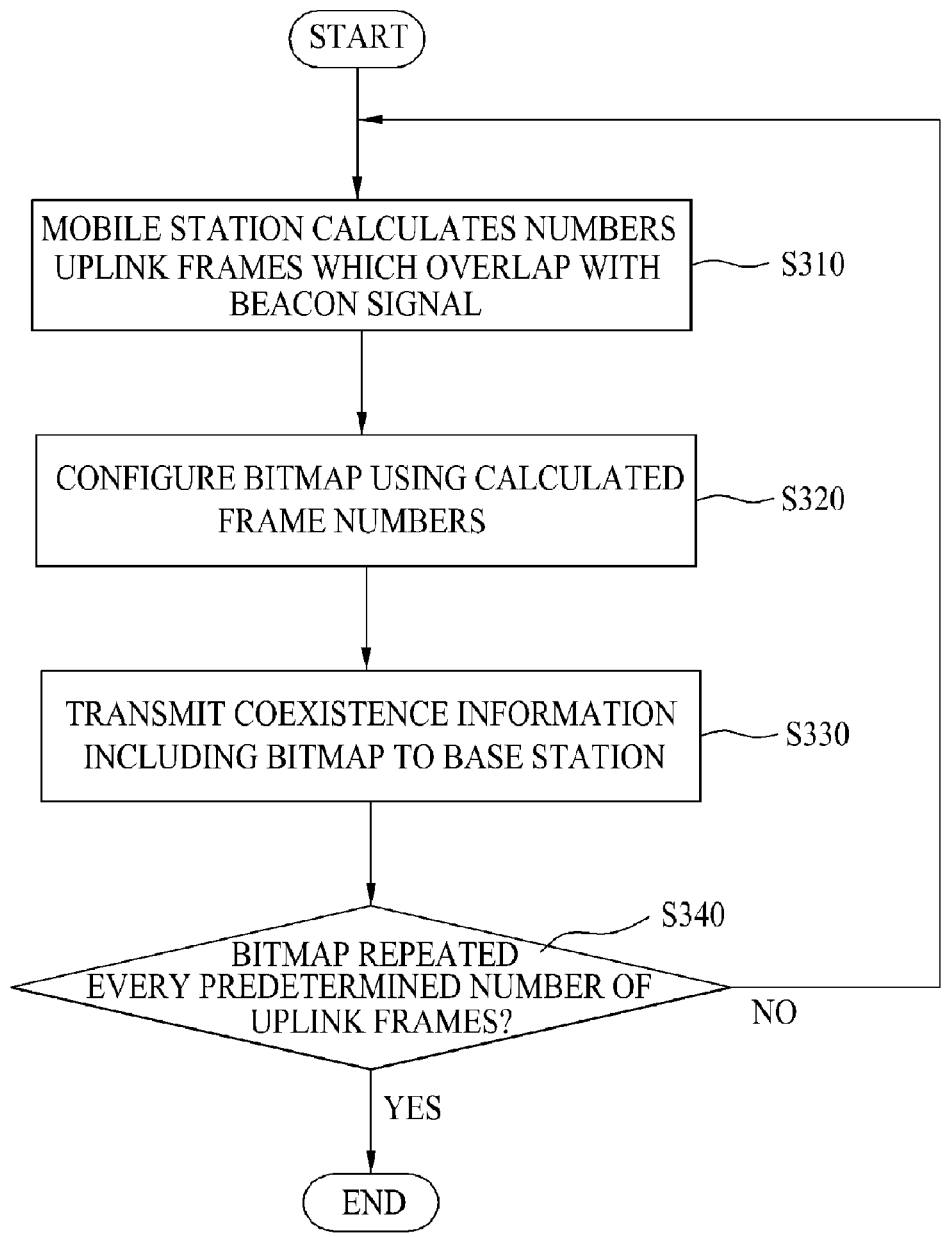
FIG. 3 is a flowchart illustrating a method for supporting coexistence with a WPAN according to another embodiment of the present invention.

FIG. 3 is a flowchart illustrating a method for supporting coexistence with a WPAN according to another embodiment of the present invention.

A mobile station calculates a portion in which an uplink frame of a broadband wireless access system and a beacon signal are overlapped and a portion in which the uplink frame and the beacon signal are not overlapped, in order to inform a base station of the broadband wireless access system when the beacon signal is received (S310).

Next, the mobile station configures a bitmap according to the portion in which the uplink frame and the beacon signal are overlapped (S320).

The mobile station transmits coexistence information including the configured bitmap to the base station (S330). The base station determines that this pattern is continuously repeated unless the mobile station transmits the coexistence information again and does not allocate slots to the mobile station in the uplink frame which overlaps with the beacon signal.

If a non-repeated pattern appears in every predetermined number of uplink frames in the mobile station (S340), then the mobile station repeats the above-described process (S310 to S330). The predetermined number of uplink frames may indicate 32 uplink frames.

Table 2 shows a message in a TLV form, which includes coexistence information including the bitmap.

TABLE 2

| Type | Length | Value | Scope |
|---|---|---|---|
| TBD | 5 | Bit #0-#4: Length of the pattern. Bit #5-#36: Pattern of the uplink frame which will not be used. Bit #37-#39: Reserved. | TBD |

Figure 4:
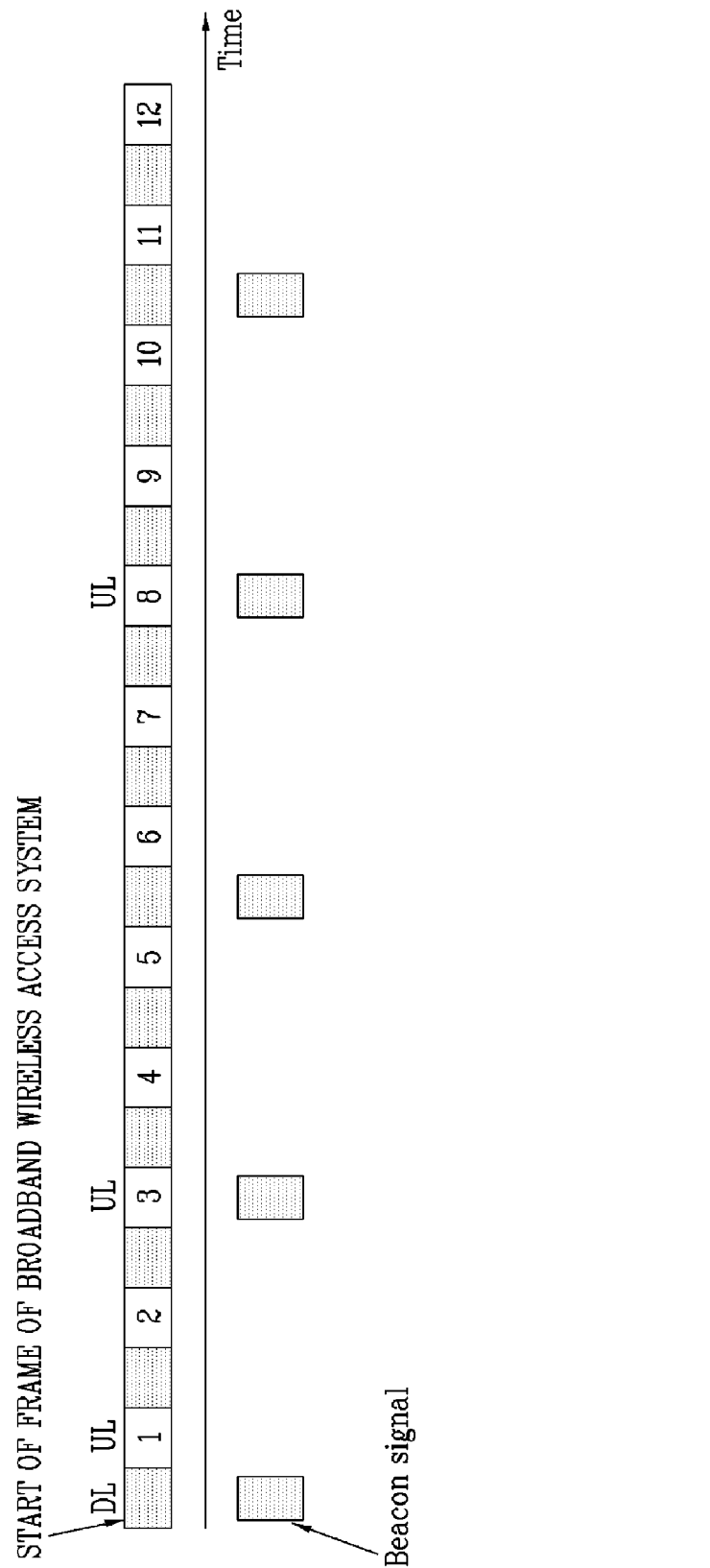
FIG. 4 is a view showing a case where a beacon signal and uplink frames are periodically overlapped in FIG. 2.

FIG. 4 is a view showing a case where the beacon signal and the uplink frames are periodically overlapped in FIG. 2.

In the example of FIG. 4, a third uplink frame and an eighth uplink frame overlap with the beacon signal. In addition, it is predicted that a thirteenth frame and an eighteenth frame will overlap with the beacon signal. In this case, if the mobile station informs the base station of bit stream information "00100", then the base station can easily know to which uplink frames the uplink slots should not be allocated. In this case, the length value of the pattern may be set to 5 in the message of the TLV form shown in Table 2 and "00100" may be allocated to the pattern.

The present invention relates to a method for supporting coexistence of a broadband wireless access system and a WPAN of WiMedia, ZigBee or the like and is applicable to an apparatus such as a base station, a mobile station or the like in a system having compatibility with IEEE 802.16e, IEEE 802.16m, IEEE 802.15, IEEE 802.11, or the like.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

As apparent from the above description, the embodiments of the present invention can be applied to various wireless access systems, for example, a 3rd Generation Partnership Project (3GPP), a 3GPP2 and/or an Institute of Electrical and Electronic Engineers 802 (IEEE 802.xx) system. Embodiments of the present invention can be applied to not only the above various wireless access system, but also all the technical fields formed by the application of the various wireless access systems. Also, embodiments of the present invention are related to methods for improving throughput of a broadband wireless access system and another wireless communication system, the embodiments of the present invention are also applicable to WPAN wireless communication system based on IEEE 802.15 standard, WLAN wireless communication system based on IEEE 802.11 standard (e.g. WiFi etc.) and WiMAX wireless communication system based on IEEE 802.16.

The invention claimed is:

1. A method for supporting coexistence with a wireless personal area network (WPAN) in a wireless communication, the method comprising: at the mobile station, calculating the numbers of uplink frames which overlap with the beacon signal; configuring a bitmap using the calculated frame numbers; and transmitting coexistence information including the bitmap to a base station; wherein the base station allocates uplink slots in consideration of the coexistence information including the bitmap.

2. The method according to claim 1, further comprising transmitting uplink signal to the base station via the uplink frames excluding the frames indicated by the bitmap.

3. The method according to claim 1, further comprising receiving the periodical beacon signal at the frames indicated by the bitmap.

4. The method according to claim 1, wherein the base station allocates uplink slots according to the bitmap.

5. A method for supporting coexistence with a wireless personal area network (WPAN) in a wireless communication, the method comprising: at the mobile station, calculating the numbers of uplink frames which overlap with the beacon signal in every predetermined number of uplink frames and configuring a bitmap using the calculated frame numbers; and transmitting coexistence information including the bitmap to a base station in every predetermined number of uplink frames; wherein the predetermined number of uplink frames is 32 uplink frames.

6. A method for supporting coexistence with a wireless personal area network (WPAN) in a mobile station which periodically receives a beacon signal for local wireless communication, the method comprising: at the mobile station, calculating information associated with the transmission of the beacon signal; and transmitting coexistence information including the calculated information about the transmission to a base station; wherein the base station calculates a time point when the reception of the beacon signal and the transmission of the uplink frames of the mobile station are overlapped, from the information associated with the transmission, and allocates uplink slots in consideration of the calculated time point.

7. The method according to claim 6, wherein the information associated with the transmission includes at least one of a start point, a duration or an interval of the beacon signal.

* * * * *